United States Patent [19]

Albrecht et al.

[11] Patent Number: 5,891,983

[45] Date of Patent: Apr. 6, 1999

[54] WATER-SOLUBLE FORMALDEHYDE-FREE POLYCONDENSATION PRODUCTS BASED ON AMINO-S-TRIAZINES

[75] Inventors: Gerhard Albrecht; Manfred Schuhbeck, both of Trostberg; Christian Huber, Garching; Josef Weichmann, Pleiskirchen; Alfred Kern, Kirchweidach, all of Germany

[73] Assignee: SKW Trostberg Aktiengesellschaft, Trostberg, Germany

[21] Appl. No.: 890,267

[22] Filed: Jul. 9, 1997

[30] Foreign Application Priority Data

Jul. 9, 1996 [DE] Germany .................. 196 27 531.8

[51] Int. Cl.$^6$ .................................................. C08G 12/30
[52] U.S. Cl. .................. 528/254; 528/229; 528/232; 528/258; 528/259; 528/265; 528/328; 524/593; 524/597
[58] Field of Search ................... 528/328, 229, 528/259, 232, 258, 265; 524/593, 597

[56] References Cited

U.S. PATENT DOCUMENTS

| | | | |
|---|---|---|---|
| 4,160,754 | 7/1979 | Schapel et al. | 528/259 |
| 4,225,481 | 9/1980 | Wagner | 528/232 |
| 4,282,135 | 8/1981 | Wagner | 528/229 |

*Primary Examiner*—P. Hampton-Hightower
*Attorney, Agent, or Firm*—Fulbright & Jaworski, LLP

[57] ABSTRACT

Water-soluble formaldehyde-free polycondensation products based on amino-s-triazines with at least two amino groups and glyoxylic acid, which contain as further component at least one amino compound and where the molar ratio of amino-s-triazine to glyoxylic acid to amino compound is 1:0.5 to 6.0:0.1 to 2.0. These polycondensation products are excellently suited as additives for aqueous suspensions of inorganic binders, especially cement, lime and gypsum. Building material mixtures which contain these polycondensation products remain workable for a considerably longer time and, in spite of this, also set more quickly.

17 Claims, No Drawings

5,891,983

WATER-SOLUBLE FORMALDEHYDE-FREE POLYCONDENSATION PRODUCTS BASED ON AMINO-S-TRIAZINES

FIELD OF THE INVENTION

The invention relates to water-soluble formaldehyde-free, polycondensation products based on amino-s-triazines with at least two amino groups and glyoxylic acid, a method of synthesizing these polycondensation products and their use as additives for hydraulic binders, in particular cement, to improve the workability and hardening properties of the building materials made therefrom.

BACKGROUND AND PRIOR ART

Aqueous suspensions of powdered inorganic or organic substances such as clays, porcelain slurries, silicate dust, chalk, soot, stone dust, pigments, talcum, powdered plastics and hydraulic binders are in practice often mixed with additives to improve their workability, i.e. their kneadability, spreadability, sprayability, pumpability or their flow properties. These additives, which usually contain ionic groups, are able to break up the agglomerates formed when water is added to these substances and to electrostatically and/or sterically stabilize the resulting solid particles. The internal frictional forces are reduced considerably as a result, and the working properties improved accordingly.

This effect plays a particularly important role in the production of building material mixtures which contain hydraulic binders such as cement, lime, gypsum or anhydrite. In order to obtain these building material mixtures in a ready-to-use and workable form it is as a rule necessary to use a lot more water for mixing than is actually required for the subsequent hydration and hardening process. This excess water evaporates later, resulting in a sizeable void fraction in the finished construction. This in turn leads to significantly poorer mechanical strength and resistance.

Through use of the additives described above it is possible to lower the quantity of excess water and/or to improve the working properties for a given water/binder value. As water-reducing agents or superplasticizers of this kind melamine formaldehyde polycondensation products containing sulfonic groups, as described for example in the DE-PS 16 71 017, are particularly well known, as also formaldehyde polycondensation products of naphthalene or alkylnaphthalene sulfonic acid as according to the EP-PS 214 412. The disadvantage of these additives is the fact that the excellent water-reducing or plasticizing effect only lasts for a short period and that through the use of formaldehyde as condensation component the products always contain a certain proportion of free formaldehyde, which ranks as a toxicological risk. The EP-A- 558 336 describes the use of non-mineral organic components based on hydroxymethylated amino carboxylic or aminosulfonic acids to accelerate setting. When used alone these synthetic products accelerate setting only slightly, having a significant effect only when used in combination with inorganic accelerators. What is more of a disadvantage, however, is the fact that these products, because of the way they are made, also contain formaldehyde.

Formaldehyde-free dispersing agents based on acrylic acid (cf. DE-OS 35 29 095), maleic monoesters and styrene (cf. EP-A 306 449) as well as alkyl polyethylene glycol monoallyl ethers and maleic anhydride (cf. EP-A 373 621) are able to prolong the workability of hydraulically setting building material mixtures for a suitable length of time, but often have the disadvantage of retarding the setting process.

Last but not least, polycondensation products of melamine and glyoxylic acid are known from the DE-OS 41 17 181 which can prolong the time of workability of cement-based building material mixtures without noticeably retarding the setting process.

The disadvantage of these polycondensation products is that their effect is limited to Portland cement containing flue ash and that they are required in relatively large quantities, which means that the cement takes longer to set than do cement mixtures which are free of additive It is true that this disadvantage can be overcome by adding to the building material mixtures in question additional additives such as calcium chloride to accelerate setting, but the use of such additives is again associated with disadvantages. Calcium chloride, for example, even in extremely low concentrations, has a highly corrosive effect on reinforcing steels used in time-tested building material mixtures. Alkali and alkaline earth hydroxides, carbonates, aluminates, silicates or fluorosilicates, which in the form of solutions are likewise known as setting accelerators, have very high pH values and if they leach out can cause ecological problems. The handling of these accelerators in powder form can lead to industrial hygiene problems. The hazard potential for man and the environment of alkaline earth metal nitrates or nitrites, lastly, which again are familiar accelerators, is sufficiently well known.

SUMMARY OF THE INVENTION

The object of the invention is accordingly to provide water-soluble formaldehyde-free polycondensation products based on amino-s-triazines with at least two amino groups and glyoxylic acid, which do not exhibit the aforementioned disadvantages characteristic of the state of the art and which, in particular, are able to maintain the flow properties of the building material mixtures made therefrom for a suitable period of time without retarding the setting and hardening process.

This object is established according to the invention by providing polycondensation products based on amino-s-triazines with at least two amino groups and glyoxylic acid, said products containing as a further component at least one amino compound and the molar ratio of amino-s-triazine to glyoxylic acid to amino compound being 1:0.5 to 6.0:0.1 to 2.

It was found unexpectedly that in contrast to the polycondensation products described in the DE-OS 41 17 181, during the production of which no increase in viscosity is observed during the course of the condensation, the polycondensation products of the invertion have a better plasticizing effect and the flow properties of the building material mixtures made in this way can be maintained for a greater length of time. Another surprising effect is that although development of rigidity is retarded, the building material mixture hardens more rapidly. This effect is as a rule only achieved through addition of setting accelerators.

DETAILED DESCRIPTION OF PREFERRED EMBODIMENT

The polycondensation products of the invention consist, as already mentioned, of altogether three components. As amino-s-triazine with at least two amino groups use is made preferably of melamine, but also of guanamines such as benzo- or acetoguanamine. It is also possible within the scope of the invention to use a mixture of such amino-s-triazines with another amino-resin-forming reagent. In this case 50 mol % of the mixture can consist of at least one other amino-resin-forming reagent such as urea, thiourea, dicyandiamide, guanidine (salts) or dicarboxylic diamides such as adipic diamide. In cases where some of the amino-s-triazine is replaced by one or more other amino-resin-forming reagents, these are included in the molar ratio.

It is recommended that the second component, glyoxylic acid, be used in the form of a commercially available 50 wt.

% aqueous solution or else as a hydrate, which is available in solid form. However, other formulations can also be used.

As third condensation component the polycondensation products of the invention contain one or more amino compounds, these being selected preferably from the following groups:

1. Amino carboxylic acids such as aspartic acid, glutamic acid, alanine, glycine, phenylglycine, iminodiacetic acid, maleamic acid
2. Aminosulfonic acids such as sulfamic acid, sulfanilic acid or taurine
3. Carboxamides, - imides, -ureides, for example acetamide, benzamide, formamide, succinimide or maleic ureide
4. Primary or secondary amines, which may also have substituents such as hydroxyl groups. Examples of such amines include methylamine, ethylamine, dimethylamine, diethylamine, ethanolamine, isopropanolamine, N-methylethanolamine, N-methylisopropanolamine, diethanolamine, N-(2,3-dihydroxypropyl)methylamine, diisopropanolamine, methyltriethylene glycolamine, methyltetraethylene glycolamine, methylpolyethylene glycolamine and so on.

It is an essential feature of the invention that the molar ratio of amino-s-triazine to glyoxylic acid to amino compound is 1:0.5 to 6.0:0.1 to 2.0. Only then do the polycondensation products exhibit the optimal technical properties.

The polycondensation products according to the invention can be produced using condensation processes which are known per se. They are preferably produced by a) precondensing amino-s-triazine and the gyloxylic acid in aqueous solution at a pH of 3.0 to 7.0 and a temperature of 20° to 95° C. until the amino-s-triazine has for the most part dissolved and b) then adding amino compound in a quantity of 0.1 to 2.0 moles per mole of amino-s-triazine used and continuing the condensation in the same temperature and pH range as in stage a) until the viscosity of the solution, measured at 20° C. and with a solids content of 20 wt. %, has a value between 2 and 20 cSt.

The preferred temperature range for stages a) and b) is 40° to 70° C., and the preferred pH range 4.0 to 6.0. The pH can be adjusted in each of the stages using the customary alkaline-reacting compounds or salts, especially hydroxides. For neutralizing strongly acidic components such as glyoxylic acid, aminosulfonic acids or amino carboxylic acids it is preferable to use sodium hydroxide. It is of advantage if the final viscosity is between 3 and 10 cSt.

As soon as the final viscosity—determined according to German Standard DIN 51 562, Part 1 with an Ubbelohde viscometer—has been obtained in stage b), the condensation reaction is stopped by addition of a basic compound. If necessary or desirable, the polycondensation products of the invention can be obtained in solid form by distilling off the solvent water, by precipitating them in a water-miscible nonsolvent for the polycondensation products or else by way of spray drying.

The polycondensation products of the invention are highly suitable for use as additives for aqueous suspensions based on inorganic binders, in particular cement, lime and gypsum, being used in a quantity of 0.01 to 10 wt. %, preferably 0.1 to 5 wt. % relative to the weight of the inorganic binder. Compared to previously known additives, the formaldehyde-free polycondensation products of the invention are able to prolong the workability of building material mixtures that incorporate them for a much longer time and in spite of this also make the building material set more quickly.

The following examples serve to explain the invention in more detail.

EXAMPLES

Example 1

270g of water and 244.1 g (1.649 mol) of 50% aqueous glyoxylic acid are introduced into a 1 l reaction vessel with a thermometer, stirrer, reflux condenser, pH equipment and dropping funnel. 123.4 g of 50% aqueous caustic soda are added while the contents of the vessel are stirred, and the pH adjusted to 4.0. The temperature is raised to 50° C. and 126.1 g of melamine (1.00 mol) added with continued stirring. The contents of the vessel are stirred at 50° C. for a further 75 minutes until the original suspension has turned into a clear solution. The pH rises during this time to 5.9. While the solution is cooled, 88 g (0.509 mol) of sulfanilic acid and 48 g of 20% caustic soda are added simultaneously, which causes the pH to drop to 5.2. The reaction mixture is then stirred at 50° C. until a final viscosity of 5.52 cSt (20 wt. % solution at 20° C.) is obtained. The pH is adjusted to 10.0 by adding 39.2 g of 50% caustic soda, and the reaction mixture cooled to 25° C.

The clear aqueous solution of polycondensation product has a solids content of 40.9 wt. %.

Example 2

The same procedure as described for Example 1, except that in the second stage 44.0 g (0.254 mol) of sulfanilic acid are added. The polycondensation is carried out at a pH of 5.23 and the condensation stopped by addition of 40.0 g of 50% caustic soda once a viscosity of 5.01 cSt (20 wt. % solution at 20° C.) has been reached.

The polycondensate solution obtained has a pH of 10.5 and a solids content of 40.1 wt. %.

Example 3

A solution of a melamine-glyoxylic acid precondensation product—prepared at 50° C. analogously to Example 1 from 126.1 g (1.00 mol) of melamine, 254.6 g (1.719 mol) of 50% glyoxylic acid, 122.2 g of 50% caustic soda and 270 g of water—is adjusted to a pH of 5.68 by addition of 62.6 g (0.50 mol) taurine and then condensed further at 50° C. until a final viscosity of 2.76 cSt (measured as 20 wt. % solution at 20° C.) is reached.

The pH is adjusted to a final level of 10.3 by addition of 171.9 g of caustic soda. The solids content of the resulting polycondensate solution is 36.2 wt. %

Example 4

The reaction described in Example 3 is repeated except that in the second stage condensation is continued until a final viscosity of 5.90 cSt has been reached.

The final pH of the polycondensate solution is 10.4, the solids content 36.3 wt. %.

Example 5

Example 1 is repeated, but in a 10 l flask and using the following quantities:

| | |
|---|---|
| 2600 g | water |
| 2523 g (17.038 mol) | 50% glyoxylic acid |
| 1173 g | 50% caustic soda |

-continued

| 1261 g (10.00 mol) | melamine |
| 880 g (5.087 mol) | sulfanilic acid |
| 588 g | 50% caustic soda |

The condensation is continued until a final viscosity of 3.74 cSt (20° C., 20 wt. % solution) is reached, and the pH adjusted to 10.3 with 460g of 50% caustic soda. The aqueous solution of polycondensation product is then transformed by means of spray drying into a pale yellow powder with a residual moisture content of 2 wt. %.

Example 6

A melamine-glyoxylic acid precondensation product is prepared analogously to that of Example 1. Instead of sulfanilic acid, however, use is made in the second reaction step of 73.6 g (0.50 mol) of glutaminic acid. Polycondensation takes place at 50° C. and a pH of 5.2 until a final viscosity of 7.36 cSt (measured at 20° C. and 20 wt. % solids content) is reached.

The pH is adjusted to a final level of 10.0 with 206.6 g of 20% caustic soda. The solids content of the solution obtained is 34.8 wt. %.

Example 7

The synthesis described in Example 1 is repeated except that use is made 30.6 g (0.50 mol) of ethanolamine instead of sulfanilic acid. The final viscosity (20 wt. % solids content, 20° C.) is 2.17 cSt. The polycondensation solution, adjusted to a pH of 10.0, has a solids content of 35.6 wt. %.

Example 8

The same procedure as in Example 1. except with the following components:

| 320 g | water |
| 327.8 g (2.208 mol) | 50% glyoxylic acid |
| 126.1 g (1.00 mol) | melamine |
| 30.0 g (0.50 mol) | urea |
| 194.4 g | 50% caustic soda |
| 88.0 g (0.509 mol) | sulfanilic acid |

The reagents are condensed at a pH of 5.2 and a temperature of 50° C. until a final viscosity of 2.50 cSt (20 wt. % solids content, 20° C.) is obtained. After the polycondensation has been finished with 38.7 g NaOH (50%) a solution with a solids content of 38.7 wt. % is obtained.

Example 9

Example 1 is repeated except that instead of the sulfanilic acid used there, use is made of methyl polyethyleneglycol monoamine with an average molecular weight of 500 g/mol.

The polycondensation solution, condensed to a viscosity of 3.41 (measured as a 20 wt. % solution at 20° C.), has a solids content of 38.2 wt. %.

Comparison 1

Commerically available sulfonated melamine formaldehyde polycondensation product in the form of its sodium salt (Melment L 10).

Comparison 2

Commercially available sulfonated naphthalene formaldehyde polycondensate (Na salt, Lomar D).

Comparison 3

Commercially available setting accelerator based on calcium nitrate (Rapid 1).

The polycondensation products of the invention were subjected to a comparative test as additives for cement-based solids suspensions in order to demonstrate their longer-lasting effect and the accelerated setting compared to conventional additives.

Test series 1

900 g of Portland cement CEM I 32.5 R (Kiefersfelden) are mixed (standard procedure. using a mixer) with 1350g of cement-testing sand (coarse fraction:fine fraction=2:1) and 405 g water (water/cement value=0.45) which contains the polycondensation products in dissolved form. The dosage of polycondensation product (solids content) comprises a uniform 0.50 wt. % relative to the cement.

As soon as the cement mortar is made up, the rate of flow is determined as well as its change with time over a period of 60 minutes. A special-steel flow channel of 80 cm length with a funnel (1000 ml capacity) is used for this purpose. The greater the distance which a constant amount (volume-based) of freshly-mixed mortar flows in the moistened channel within a period of 120 seconds, the greater is the effect which the particular plasticizer has on the workability of the mortar. The results of the test are shown in Table 1.

TABLE 1

Flow characteristics of cement mortar mixtures containing additives of the invention and comparison additives

| Additive according to | Solids content (wt. %) | Flow distance in mm | | | |
| --- | --- | --- | --- | --- | --- |
| | | immediately | after 15 min. | after 30 min. | after 45 min. |
| Ex. 1 | 40.9 | 720 | 715 | 710 | 700 |
| Ex. 2 | 40.1 | 650 | 660 | 680 | 670 |
| Ex. 3 | 36.2 | 590 | 580 | 580 | 570 |
| Ex. 4 | 36.3 | 580 | 570 | 570 | 560 |
| Ex. 5 | 98.0 | 770 | 770 | 770 | 730 |
| Ex. 6 | 34.8 | 550 | 530 | 500 | 490 |
| Ex. 7 | 35.6 | 540 | 540 | 530 | 520 |
| Ex. 8 | 38.7 | 640 | 630 | 610 | 580 |
| Ex. 9 | 38.2 | 560 | 560 | 550 | 550 |
| Comp. 1 | 40.0 | 450 | 390 | 340 | 290 |
| Comp. 2 | 37.0 | 500 | 460 | 400 | 340 |
| Comp. 3 | 36.2 | 140 | 110 | 110 | 100 |
| without | — | 150 | 110 | 100 | 100 |

Cement: CEMI 32.5 R Kiefersfelden
Water/cement: 0.45
Dosage of additive 0.50 wt. % solids relative to cement.

Test series 2

To demonstrate the accelerating effect which the polycondensation products of the invention have on setting, cement pastes are prepared according to German Standard DIN 1164, part 7, (corresponds to EN 196, part 3), and the effect compared with that of comparison products of the same consistency (Table 2).

TABLE 2

Setting characteristics of cement pastes with polycondensation products according to the invention and with comparison products

| Additive according to | Dosage[1] (wt %) | Water reduction[2] (%) | Setting time | |
| --- | --- | --- | --- | --- |
| | | | initial (h:min) | final (h:min) |
| Ex. 1 | 0.30 | 19.0 | 0.01 | 0.17 |
| Ex. 1 | 0.60 | 21.4 | 0.01 | 0.30 |
| Ex. 1 | 1.20 | 24.5 | 0.02 | 0.50 |
| Ex. 2 | 0.30 | 18.1 | 0.01 | 0.20 |

TABLE 2-continued

Setting characteristics of cement pastes with polycondensation products according to the invention and with comparison products

| Additive according to | Dosage[1] (wt %) | Water reduction[2] (%) | Setting time initial (h:min) | Setting time final (h:min) |
|---|---|---|---|---|
| Ex. 3 | 0.30 | 17.1 | 0.03 | 0.39 |
| Ex. 4 | 0.30 | 16.4 | 0.01 | 0.13 |
| Ex. 5 | 0.30 | 20.0 | 0.01 | 0.19 |
| Ex. 6 | 0.30 | 16.6 | 0.01 | 0.12 |
| Ex. 7 | 0.30 | 16.9 | 0.04 | 0.43 |
| Ex. 8 | 0.30 | 18.3 | 0.03 | 0.22 |
| Ex. 9 | 0.30 | 16.6 | 0.05 | 0.50 |
| Comp. 1 | 0.45 | 16.3 | 2.40 | 4.51 |
| Comp. 2 | 0.45 | 19.9 | 3.00 | 5.05 |
| Comp. 3 | 0.45 | 0.0 | 0.01 | 0.16 |
| without | — | 0.0 | 2.25 | 4.45 |

[1]Solids content of the polycondensation product relative to the weight of the cement
[2]Compared to a cement mixture of the same consistency but without additive
Cement: CEMI 32.5 R Kiefersfelden
Wate/cement of zero reference: 0.30

We claim:

1. Water-soluble formaldehyde-free polycondensation products derived from amino-s-triazines with at least two amino groups and glyoxylic acid, wherein
said products contain as a further component at least one amino compound and the molar ratio of amino-s-triazine to glyoxylic acid to amino compound is 1:0.5 to 6.0:0.1 to 2.0.

2. Polycondensation products according to claim 1, wherein
they contain melamine as amino-s-triazine.

3. Polycondensation products according to claim 1 wherein
up to 50 mol % of the amino-s-triazine is replaced by another amino-resin-forming reagent selected from the group urea, thiourea, dicyandiamide or guanidine (salts).

4. Polycondensation products according to one of claims 1, 2, or 3, wherein
they contain an amino carboxylic acid as amino compound.

5. Polycondensation products according to claims 1, 2, or 3, wherein
they contain an aminosulfonic acid as amino compound.

6. Polycondensation products according to one of claims 1, 2, or 3, wherein
they contain a carboxamide, -imide or -ureide as amino compound.

7. Polycondensation products according to one of claims 1, 2, or 3, wherein
they contain a primary or secondary and maybe substituted amine as amino compound.

8. Polycondensation products according to claim 7, wherein
the primary or secondary amines contain hydroxyl groups.

9. Polycondensation products according to claim 1, wherein the viscosity of their aqueous solutions, measured at 20° C. and with 20 wt. % solids content, is from about 2 to about 20 cSt.

10. Polycondensation products according to claim 9, wherein their viscosity is from about 3 to about 10 cSt.

11. Polycondensation products according to claim 5, containing melamine, glyoxylic acid and sulfanilic acid in the molar ratio 1:1.7:0.5.

12. A method of synthesizing polycondensation products according to one of claims 1, 9 or 10, wherein
a) amino-s-triazine and glyoxylic acid in a molar ratio of 1:0.5 to 6.0 are precondensed in aqueous solution at a pH in the range from 3.0 to 7.0 and a temperature in the range from 20° to 95° C. until the amino-s-triazine is for the most part dissolved and
b) then amino compound is added in a quantity of 0.1 to 2.0 moles per mole of amino-s-triazine used and the condensation continued in the same temperature and pH range as in stage a) until the viscosity of the solution, measured at 20° C. and 20 wt % solids content, has a value from about 2 to about 20 cSt.

13. The method of claim 12, wherein
the temperature in stages a) and b) is in the range from 40° to 70° C.

14. The method of claim 12 wherein
the condensation is continued in stage b) until the viscosity of the aqueous solution is from about 3 to about 10 cSt.

15. A method for improving stability of an inorganic binder comprising adding to the inorganic binder the polycondensation products according to claim 1, in a quantity of from 0.1 to 10 wt. % relative to the weight of the inorganic binder.

16. The method according to claim 15, wherein the polycondensation products are added in a quantity of from 0.1 to 5 wt. % relative to the weight of the inorganic binder.

17. The method according to claim 15, wherein the inorganic binder is cement.

* * * * *